US012199523B2

(12) United States Patent
Ogawa et al.

(10) Patent No.: US 12,199,523 B2
(45) Date of Patent: Jan. 14, 2025

(54) POWER CONTROL APPARATUS

(71) Applicant: DENSO CORPORATION, Kariya (JP)

(72) Inventors: Yuuki Ogawa, Kariya (JP); Takuya Okubo, Kariya (JP)

(73) Assignee: DENSO CORPORATION, Kariya (JP)

( * ) Notice: Subject to any disclaimer, the term of this patent is extended or adjusted under 35 U.S.C. 154(b) by 133 days.

(21) Appl. No.: 18/180,349

(22) Filed: Mar. 8, 2023

(65) Prior Publication Data

US 2023/0223863 A1    Jul. 13, 2023

Related U.S. Application Data

(63) Continuation of application No. PCT/JP2021/029317, filed on Aug. 6, 2021.

(30) Foreign Application Priority Data

Sep. 10, 2020 (JP) ................................. 2020-152123

(51) Int. Cl.
*H02M 7/48* (2007.01)
*H02M 1/084* (2006.01)
*H02M 7/538* (2007.01)

(52) U.S. Cl.
CPC ......... *H02M 7/4803* (2021.05); *H02M 1/084* (2013.01); *H02M 7/53803* (2013.01)

(58) Field of Classification Search
CPC .... H02M 7/4803; H02M 7/4826; H02M 7/44; H02M 7/53803; H02M 7/537; H02M 1/084; H02M 1/088; H02M 1/12; H02M 1/14; H02M 1/08
See application file for complete search history.

(56) References Cited

U.S. PATENT DOCUMENTS

| 2014/0085955 A1* | 3/2014 | Maeda | H02M 7/5387 363/132 |
| 2020/0021202 A1* | 1/2020 | Okaura | H05K 7/209 |
| 2022/0069726 A1* | 3/2022 | Bhupathi | H02J 3/381 |

FOREIGN PATENT DOCUMENTS

| JP | 2003-173952 A | 6/2003 |
| JP | 2015-167428 A | 9/2015 |

* cited by examiner

*Primary Examiner* — Nguyen Tran
(74) *Attorney, Agent, or Firm* — Oliff PLC

(57) ABSTRACT

A power control apparatus, comprising: a first wiring and a second wiring connected to a power source; a first capacitor connected to the first wiring and the second wiring; an electrical component including a plurality of switches connected in parallel with the first capacitor through the first wiring and the second wiring; and a second capacitor which is connected to one of the first wiring and the second wiring and is connected to a reference potential portion having a constant potential, wherein an impedance of a first conducting path between another side connection point, which is connected to the first capacitor, of the other one of the first wiring and the second wiring and the power supply not through the first capacitor, is higher than an impedance of a second conducting path between the another side connection point and the second capacitor through the first capacitor.

12 Claims, 4 Drawing Sheets

POWER CONTROL APPARATUS

CROSS REFERENCE TO RELATED APPLICATIONS

The present application is a continuation application of International Patent Application No. PCT/JP2021/029317 filed on Aug. 6, 2021, which designated the U.S. and is based on and claims the benefit of priority from Japanese Patent Application No. 2020-152123 filed on Sep. 10, 2020, and the entire disclosure of the above application is incorporated herein by reference.

TECHNICAL FIELD

The disclosure provided in this specification relates to a power control apparatus.

BACKGROUND

A power control apparatus is disposed between a battery and an electric motor, and transforms electric power. The power control apparatus may include a voltage converter circuit and/or an inverter circuit. Further, actual application of the power control apparatus requires additional noise suppressing circuits. For example, the power control apparatus may have a DC smoothing circuit including a capacitor, and a noise filter circuit also including a capacitor. As a result, power control apparatus needs many number of parts. In the above aspects, or in other aspects not mentioned, there is a need for further improvements in a power control apparatus.

According to an aspect of the present disclosure a power control apparatus comprises: a first wiring and a second wiring connected to a power source; a first capacitor connected to the first wiring and the second wiring; an electrical component including a plurality of switches connected in parallel with the first capacitor through the first wiring and the second wiring; and a second capacitor which is connected to one of the first wiring and the second wiring and is connected to a reference potential portion having a constant potential, wherein an impedance of a first conducting path between another side connection point, which is connected to the first capacitor, of the other one of the first wiring and the second wiring and the power supply not through the first capacitor is higher than an impedance of a second conducting path between the another side connection point and the second capacitor through the first capacitor.

According to this, a current noise generated on a side of the first wiring and a side of the second wiring can easily flow to the second capacitor connected to one of the first wiring and the second wiring. Therefore, even if the second capacitor is not connected to the first wiring and the second wiring, respectively, the current noise generated on the side of the first wiring and the side of the second wiring can be removed. This reduces the number of parts.

BRIEF DESCRIPTION OF DRAWINGS

The disclosure is further described with reference to the accompanying drawings in which.

DETAILED DESCRIPTION

Figure 1:
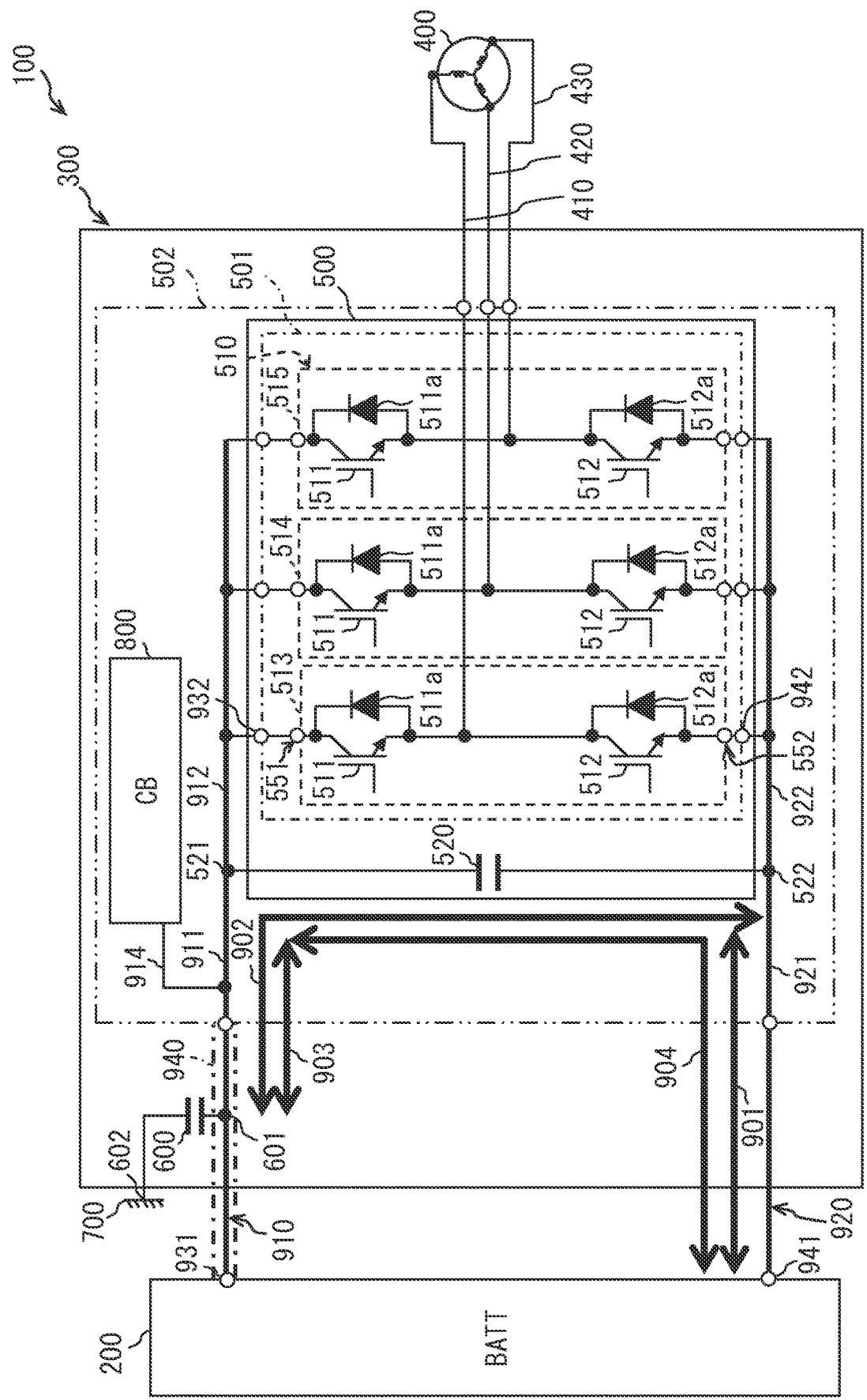
FIG. 1 is a circuit diagram illustrating an in-vehicle system.

JP2003-173952A discloses an inverter having a DC smoothing circuit connected to a battery, a three-phase AC conversion circuit connected to the DC smoothing circuit, and a smoothing capacitor.

The DC smoothing circuit has two current paths connected to the battery. Each of these two current paths is provided with one Y capacitor for removing current noise leaking from the three-phase AC conversion circuit. Therefore, there is a possibility that the number of parts increases.

It is an object of the present disclosure to provide a power control apparatus in which an increase in the number of parts is suppressed.

The following will describe embodiments for carrying out the present disclosure with reference to the drawings. In each embodiment, parts corresponding to the elements described in the preceding embodiments are denoted by the same reference numerals, and redundant explanation may be omitted. When only a part of a configuration is described in an embodiment, another preceding embodiment may be applied to the other parts of the configuration.

In addition, not only the combination between portions explicitly described that the combination is possible in each embodiment, but also partial combinations between the embodiments, between the embodiment and the modification, and between the modifications can be made if there is no problem in the combination in particular even when not explicitly described.

(First Embodiment) First, an in-vehicle system 100 provided with a power control apparatus 300 is described based on FIG. 1. The in-vehicle system 100 is a system for an electric vehicle. The in-vehicle system 100 includes a battery 200, a power control apparatus 300, and a motor 400. The battery 200 corresponds to a power source. In the drawings, the battery 200 is abbreviated as "BATT".

Further, the in-vehicle system 100 has a plurality of ECUs (not shown). The ECU is mounted on a circuit board 800. The ECUs transmit signals to and receive signals from each other via a bus wiring. The ECUs control an electric vehicle in a cooperative manner. The regeneration and powering of the motor 400 according to a state of charge (SOC) of the battery 200 are controlled by the ECUs. The SOC is an abbreviation of state of charge. The ECU is an abbreviation of electronic control unit. Note that the circuit board 800 is abbreviated as "CB" in the drawings.

The battery 200 includes a plurality of secondary batteries. The secondary batteries form a battery stack connected in series. The SOC of the battery stack corresponds to the SOC of the battery 200. As the secondary batteries, a lithium ion secondary battery, a nickel hydrogen secondary battery, an organic radical battery, or the like may be employed.

<Power Control Apparatus> The power control apparatus 300 has an inverter 500 and a second capacitor 600. The power control apparatus 300 performs power conversion between the battery 200 and the motor 400. The power control apparatus 300 converts a DC power of the battery 200 into an AC power. The power control apparatus 300 converts the AC power generated by power generation, i.e., regeneration of the motor 400 into the DC power.

The motor 400 is coupled with an output shaft of an electric vehicle which is not shown. The rotational energy of the motor 400 is transmitted to traveling wheels of the electric vehicle via the output shaft. On the contrary, the rotational energy of the traveling wheels is transmitted to the motor 400 via the output shaft.

The motor 400 is electrically driven by the AC power supplied from the power control apparatus 300. Accordingly, propulsive force is applied to the traveling wheels. Further, the motor 400 performs regeneration by the rotational energy transmitted from the traveling wheels. The AC power generated by this regeneration is converted into the DC power by the power control apparatus 300. This DC power is supplied to the battery 200. The DC power is also supplied to various electric loads mounted on the electric vehicle.

<Inverter> The inverter 500 has an electrical component 501 including a leg group 510 having a plurality of switches and a first capacitor 520. The inverter 500 is connected to the first power supply busbar 910 and the second power supply busbar 920 which are connected to the battery 200. The first power supply busbar 910 is connected to the positive electrode of the battery 200. The second power supply busbar 920 is connected to the negative electrode of the battery 200.

As shown in FIG. 1, the electrical component 501 and the first capacitor 520 are connected in parallel to the first power supply busbar 910 and the second power supply busbar 920. The first power supply busbar 910 corresponds to a first wiring. The second power supply busbar 920 corresponds to a second wiring.

The leg group 510 described above has a U-phase leg 513, a V-phase leg 514, and a W-phase leg 515. Each of these three-phase legs has a first high-side switch 511 and a first low-side switch 512 as switches. Also, each of the three-phase legs has a first high-side diode 511a and a first low-side diode 512a as diodes. The first high-side switch 511 and the first low-side switch 512 correspond to switches.

A cathode connection point of the first high-side diode 511a is connected to a collector electrode of the first high-side switch 511. An anode connection point of the first high-side diode 511a is connected to an emitter electrode of the first high-side switch 511. In this configuration, the first high-side diode 511a is connected in a reverse parallel manner to the first high-side switch 511.

A cathode connection point of the first low-side diode 512a is connected to a collector electrode of the first low-side switch 512. An anode connection point of the first low-side diode 512a is connected to an emitter electrode of the first low-side switch 512. In this configuration, the first low-side diode 512a is connected in a reverse parallel manner to the first low-side switch 512.

The switches and diodes provided in each of the three-phase legs are resin-sealed with a resin member (not shown). A part of the collector terminal connected to the collector electrode of the first high-side switch 511 is exposed from the resin member. A part of the collector terminal is connected to the first power supply busbar 910.

A part of the emitter terminal connected to the emitter electrode of the first low-side switch 512 is exposed from the resin member. A part of the emitter terminal is connected to the second power supply busbar 920.

A part of switch terminals such as gate terminals and sensor terminals connected to the gate electrodes of the first high-side switch 511 and the first low-side switch 512 are exposed from the resin member. A switch terminal is connected to the circuit board 800.

A part of the output terminal connected to each of the emitter electrode of the first high-side switch 511 and the collector electrode of the first low-side switch 512 is exposed from the resin member.

The U-phase busbar 410 is connected to the output terminal connected to the emitter electrode of the first high-side switch 511 and the collector electrode of the first low-side switch 512 provided in the U-phase leg 513. The U-phase busbar 410 is connected to the U-phase stator coil of the motor 400.

The V-phase busbar 420 is connected to the output terminal connected to the emitter electrode of the first high-side switch 511 and the collector electrode of the first low-side switch 512 provided in the V-phase leg 514. The V-phase busbar 420 is connected to the V-phase stator coil of the motor 400.

The W-phase busbar 430 is connected to the output terminal connected to the emitter electrode of the first high-side switch 511 and the collector electrode of the first low-side switch 512 provided in the W-phase leg 515. The W-phase busbar 430 is connected to the W-phase stator coil of the motor 400.

In this embodiment, n-channel IGBTs are used as the switches. However, MOSFETs can be used instead of IGBTs for these switches. If the MOSFETs are used as the switches, the diode may be omitted.

These switches can be made from semiconductors such as Si and wide-gap semiconductors such as SiC. A material of semiconductor elements is not particularly limited.

<First Capacitor> The first capacitor 520 is a smoothing capacitor which smooths pulsating current that occurs when the AC current is rectified to the DC current.

The first capacitor 520 has two electrodes. One of these two electrodes is connected to the first power supply busbar 910 at a first capacitor connection point 521. The other electrode of these two electrodes is connected to the second power supply busbar 920 at a second capacitor connection point 522.

<Second Capacitor> The second capacitor 600 is a filter capacitor for removing current noise flowing through the first power supply busbar 910 and the second power supply busbar 920. A high-frequency current noise generated by the inverter 500 and a current noise generated by an electromagnetic noise entering the power supply busbars flow through these power supply busbars.

The second capacitor 600 has two electrodes. One of these two electrodes is connected to the first power supply busbar 910 at a third capacitor connection point 601. The other electrode of these two electrodes is connected to a vehicle body 700 at a fourth capacitor connection point 602. Note that the fourth capacitor connection point 602 may be not connected to the vehicle body 700. The second capacitor 600 may be connected to a constant reference potential on which a potential is maintained constant. The vehicle body 700 corresponds to a reference potential portion.

Also, a capacitance of the second capacitor 600 is larger than a stray capacitance of the battery 200.

<First Power Supply Busbar and Second Power Supply Busbar> As described above, the electrical component 501 and the first capacitor 520 are connected in parallel to the first power supply busbar 910 and the second power supply busbar 920. The first power supply busbar 910 is connected to the positive electrode of the battery 200. The second power supply busbar 920 is connected to the negative electrode of the battery 200.

The first capacitor connection point 521, which is connected to the first capacitor 520, of the first power supply busbar 910 is located between a first coupling point 931, which is coupled with the battery 200, of the first power supply busbar 910 and a second coupling point 932, which is coupled with the electrical component 501, of the first power supply busbar 910. The first capacitor connection point 521 corresponds to a one side connection point.

The second capacitor connection point 522, which is connected to the first capacitor 520, of the second power supply busbar 920 is located between a third coupling point 941, which is coupled with the battery 200, of the second power supply busbar 920 and a fourth coupling points 942, which is coupled with the electrical component 501, of the second power supply busbar 920. The second capacitor connection point 522 corresponds to the other side connection point.

Hereinafter, in order to simplify explanation, a portion of the first power supply busbar 910 between the first coupling point 931 and the first capacitor connection point 521 is referred to as a first propagation portion 911. A portion of the first power supply busbar 910 between the first capacitor connection point 521 and the second coupling point 932 is referred to as a second propagation portion 912. Note that the first coupling point 931 corresponds to a third connection point.

Similarly, a portion of the second power supply busbar 920 between the third coupling point 941 and the second capacitor connection point 522 is referred to as a third propagation portion 921. A portion of the second power supply busbar 920 between the second capacitor connection point 522 and the fourth coupling point 942 is referred to as a fourth propagation portion 922. Note that the third coupling point 941 corresponds to a first connection point. The fourth coupling point 942 corresponds to the second connection point.

<Connection Location of Second Capacitor> As shown in FIG. 1, in this embodiment, a connection point, which is connected to the first power supply busbar 910, of the second capacitor 600 is located at the first propagation portion 911 of the first power supply busbar 910. In order to simplify the explanation, the connection point, which is connected to the first power supply busbar 910, of the second capacitor 600 is referred to as the third capacitor connection point 601.

In other words, the third capacitor connection point 601 is located between the first coupling point 931 and the first capacitor connection point 521. Note that the third capacitor connection point 601 may be located at the second propagation portion 912.

Also, the second capacitor 600 may be connected to the second power supply busbar 920. In that case, the second capacitor 600 is connected to either the third propagation portion 921 or the fourth propagation portion 922 of the second power supply busbar 920. In that case, the third capacitor connection point 601 is located at the third propagation portion 921 or the fourth propagation portion 922.

<Current Noise and Impedance> As noted above, the electrical component 501 includes a plurality of switches. The DC power is converted into the AC power, and the AC power is converted into the DC power by PWM-controlling the plurality of switches. Due to this PWM-control, a high frequency current noise is generated from the plurality of switches. This current noise flows from the electrical component 501 to the second propagation portion 912 and the fourth propagation portion 922, respectively.

This current noise has a higher frequency than the AC power flowing through the first power supply busbar 910 and the second power supply busbar 920. In this current noise frequency band, an impedance of a first conducting path 901 between the second capacitor connection point 522 and the third coupling point 941 is higher than an impedance of a second conducting path 902 between the second capacitor connection point 522 and the third capacitor connection point 601.

Since this impedance magnitude relationship, an impedance of the first capacitor 520 is naturally lower than an impedance of the first conducting path 901.

In this current noise frequency band, an impedance of a third conducting path 903 between the first capacitor connection point 521 and the third capacitor connection point 601 is lower than an impedance of a fourth conducting path 904 between the first capacitor connection point 521 and the third coupling point 941.

The first conducting path 901, the second conducting path 902, the third conducting path 903 and the fourth conducting path 904 described above are indicated by solid line arrows in FIG. 1. As shown in FIG. 1, a first conducting path 901 includes the third propagation portion 921. The second conducting path 902 includes the first capacitor 520 and a part of the first propagation portion 911. The third conducting path 903 includes a part of the first propagation portion 911. The fourth conducting path 904 includes the first capacitor 520 and the third propagation portion 921.

<Configuration Elements of Power Control Apparatus> The power control apparatus 300 has a case 502 in addition to circuit components described so far. The inverter 500 is accommodated in the case 502. As shown in FIG. 1, a part of the first propagation portion 911 and a part of the third propagation portion 921 are exposed from the case 502. The second capacitor 600 is connected to a part of the first propagation portion 911 exposed from the case 502. The second capacitor 600 is located outside the case 502.

A part of the first propagation portion 911 exposed from the case 502 is covered with a shield portion 940 made of a member with high magnetic permeability. Since the shield part 940 covers the first propagation portion 911 exposed from the case 502, it is easy to suppress the electromagnetic noise from an outside from entering the first propagation portion 911.

<Operations and Advantages> As described above, an impedance of the first conducting path 901 is higher than an impedance of the second conducting path 902 in the current noise frequency band. Therefore, the current noise generated on a side of the second power supply busbar 920 of the electrical component 501 is more likely to flow through the second conducting path 902 than the first conducting path 901.

In addition, the impedance of the third conducting path 903 is lower than the impedance of the fourth conducting path 904 in the current noise frequency band. Therefore, the current noise generated on a side of the first power supply busbar 910 of the electrical component 501 is more likely to flow through the third conducting path 903 than the fourth conducting path 904.

As described above, a part of the first propagation part 911 is included in the second conducting path 902 and the third conducting path 903. The second capacitor 600 is connected to a portion of the first propagation portion 911 at the third capacitor connection point 601.

As a result, the current noises generated on a side of the first power supply busbar 910 and a side of the second power supply bus bar 920 of the electrical component 501 are more likely to flow through the second capacitor 600.

Therefore, even if the second capacitor 600 is not connected to each of the first power supply busbar 910 and the second power supply busbar 920, respectively, it is possible to remove the current noise generated on the side of the first power supply busbar 910 and the side of the second power supply busbar 920 of the electrical component 501 respectively. As a result, the number of parts can be reduced.

As described above, the second capacitor 600 is located outside the case 502. As a result, the arrangement of the electrical component 501 and the first capacitor 520 inside the case 502 is less likely to be restricted. The degree of freedom in designing the electrical component 501 and the first capacitor 520 inside the case 502 is likely to be improved.

As described above, the capacitance of the second capacitor 600 is larger than the stray capacitance of the battery 200. Therefore, the current noise flowing through the first propagation portion 911 is easily removed by the second capacitor 600.

Figure 2:
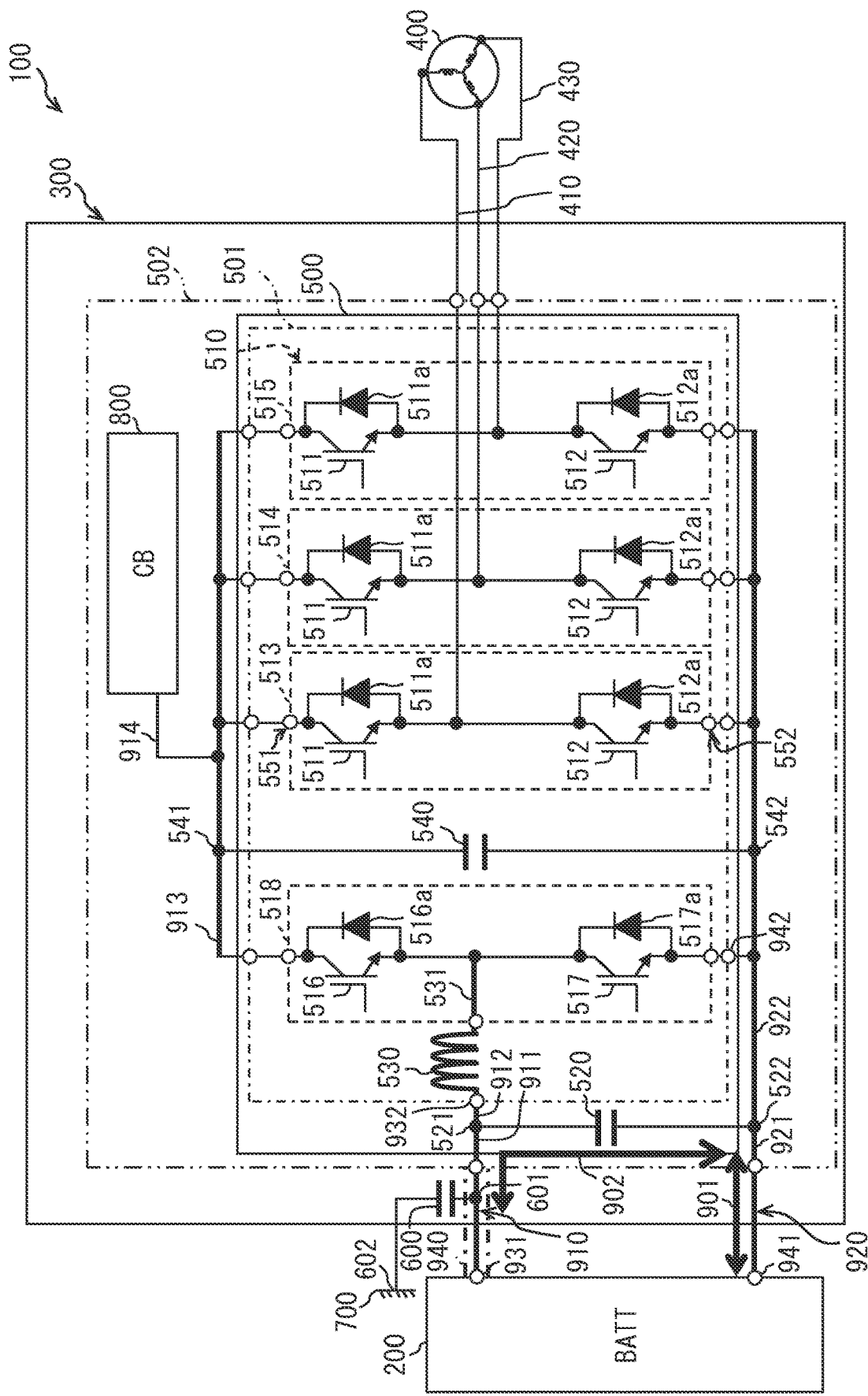
FIG. 2 is a modified example of a circuit diagram showing an in-vehicle system.

(First Modification) As shown in FIG. 2, the electrical component 501 may include a reactor 530, a coupling busbar 531, an A-phase leg 518, and a third capacitor 540 in addition to the leg group 510. The A-phase leg 518 consists of series connected two of the second high-side switch 516 and the second low-side switch 517. The second high-side switch 516 corresponds to an auxiliary switch.

In addition to the first propagation portion 911 and the second propagation portion 912, the first power supply busbar 910 has a fifth propagation portion 913 connected to the second propagation portion 912 via the reactor 530 and the second high-side switch 516. Note that the reactor 530 and the second high-side switch 516 play a part of the first power supply busbar 910 that connects the second propagation portion 912 and the fifth propagation portion 913.

One end of the reactor 530 is connected to one end of the second propagation portion 912 as shown in FIG. 2. The other end of the reactor 530 is connected to a one end of the coupling busbar 531. The other end of the coupling busbar 531 is connected to a midpoint between the second high-side switch 516 and the second low-side switch 517 provided on the A-phase leg 518. A connection point between one end of the second propagation part 912 and one end of the reactor 530 corresponds to a second coupling point 932.

Also, the collector electrode of the second high-side switch 516 is connected to the fifth propagation portion 913. The emitter electrode of the second low-side switch 517 is connected to the fourth propagation portion 922. The emitter electrode of the second high-side switch 516 and the collector electrode of the second low-side switch 517 are connected. As a result, the second high-side switch 516 and the second low-side switch 517 are connected in series in an order from the fifth propagation portion 913 toward the fourth propagation portion 922.

In addition to the A-phase leg 518, the third capacitor 540 and the above leg group 510 are connected to the fifth propagation portion 913 and the fourth propagation portion 922. The A-phase leg 518, the third capacitor 540, and the leg group 510 are connected in parallel between the fifth propagation portion 913 and the fourth propagation portion 922. The leg group 510 is connected to the fifth propagation portion 913 at the first switch connection point 551. The leg group 510 is connected to the fourth propagation portion 922 at the second switch connection point 552.

The third capacitor 540 has two electrodes. One of these two electrodes is connected to the fifth propagation portion 913 at a fifth capacitor connection point 541. The other electrode of these two electrodes is connected to the fourth propagation portion 922 at a sixth capacitor connection point 542.

An impedance between the fifth capacitor connection point 541 and the first coupling point 931 tends to be higher than an impedance between the fifth capacitor connection point 541 and the third coupling point 941 via the third capacitor 540.

Therefore, the current noise generated on a side of the fifth propagation portion 913 of the leg group 510 easily flows through the third capacitor 540 to the fourth propagation portion 922.

Further, the current noise generated on the side of the fourth propagation portion 922 of the leg group 510 also tends to flow to the fourth propagation portion 922. As described above, the first capacitor 520 is connected to the second power supply busbar 920 at the second capacitor connection point 522. The current noise generated in the leg group 510 easily flows through the fourth propagation portion 922 to the second capacitor connection point 522.

As described above, an impedance of the first conducting path 901 is higher than an impedance of the second conducting path 902 in the current noise frequency band. The current noise flown through the second capacitor connection point 522 flows more easily through the second conducting path 902 than through the first conducting path 901.

As a result, the current noise easily flows into the second capacitor 600. Even if the second capacitors 600 is not connected to the first power supply busbar 910 and the second power supply busbar 920, respectively, it is configured to be possible to remove the current noise generated in the leg group 510.

Figure 3:
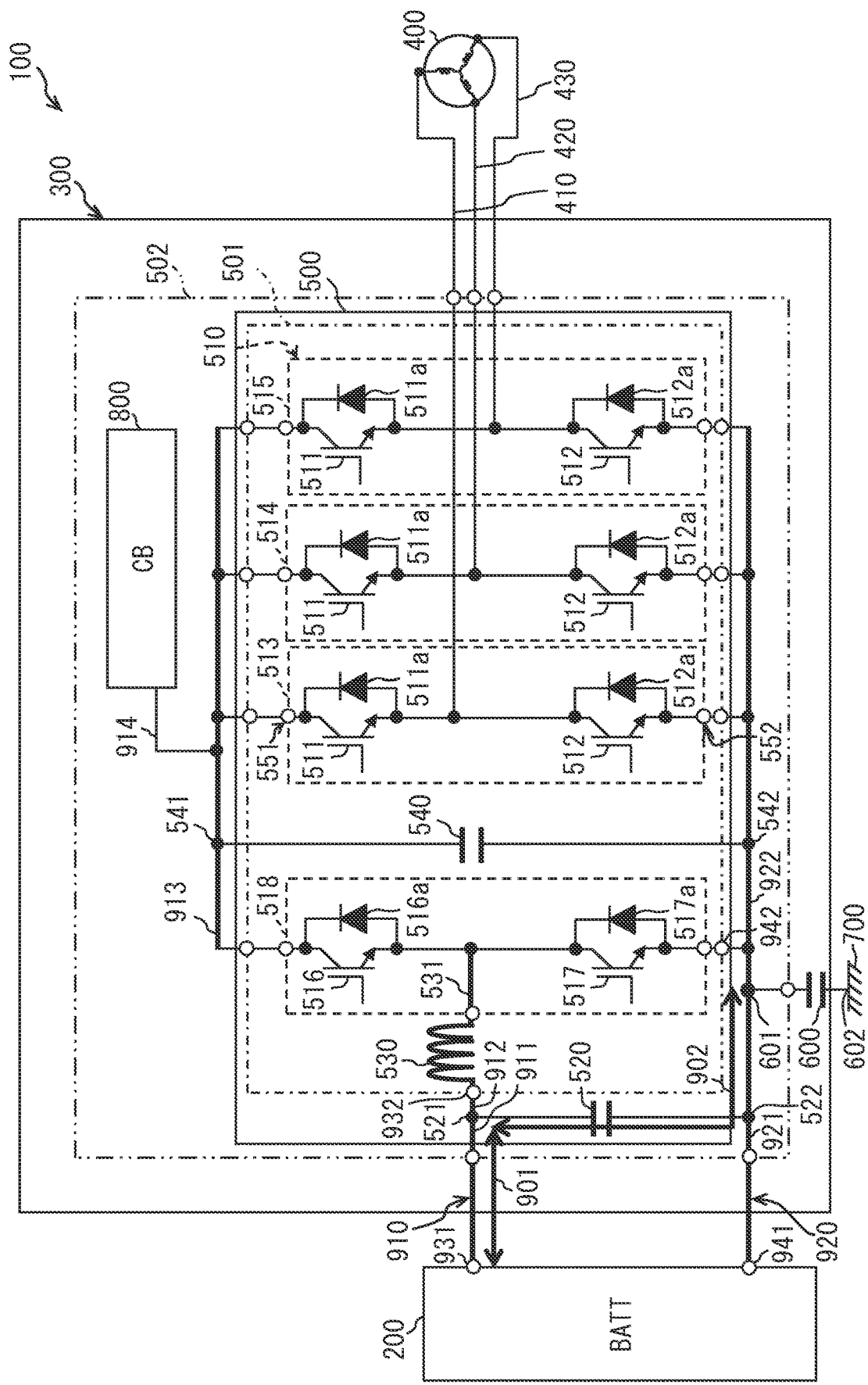
FIG. 3 is a modified example of a circuit diagram showing an in-vehicle system.

(Second Modification) In the first modification, as shown in FIG. 2, the configuration in which the third capacitor connection point 601 is located between the first coupling point 931 and the first capacitor connection point 521 is described. However, the third capacitor connection point 601 may be located between the second capacitor connection point 522 and the sixth capacitor connection point 542 as shown in FIG. 3 while maintaining the circuit configuration described in the first modification.

In that case, the current noise generated in the leg group 510 and the A-phase leg 518 and flown through the fourth propagation portion 922 tends to flow to the third capacitor connection point 601 before flowing to the second capacitor connection point 522. It is configured to be possible to remove the current noise by the second capacitor 600 before entering to the second capacitor connection point 522.

Note that the first conducting path 901 includes a first propagation portion 911. The second conducting path 902 includes the first capacitor 520 and a part of the fourth propagation portion 922. The first capacitor connection point 522 corresponds to a one side connection point. Accordingly, the first capacitor connection point 521 corresponds to the other side connection point. The first coupling point 931 corresponds to the first connection point. The second coupling point 932 corresponds to the second connection point. The third coupling point 941 corresponds to the third connection point. The first switch connection point 551 corresponds to the other side switch connection point. The second switch connection point 552 corresponds to the one side switch connection point.

As described above, the impedance of the first conducting path 901 is higher than the impedance of the second conducting path 902. Therefore, even if the current noise generated on a side of the fifth propagation portion 913 of the leg group 510 and the A-phase leg 518 flows into the first capacitor connection point 521, it flows more easily through the second conducting path 902 rather than the first conducting path 901.

As a result, the current noise easily flows into the second capacitor 600. Even if the second capacitor 600 is not connected to the first power supply busbar 910 and the second power supply busbar 920, respectively, it is configured to be possible to remove the current noise generated in the leg group 510 and the A-phase led 518.

Although not shown, a second capacitor 600 may be provided between the third coupling point 941 and the second capacitor connection point 522. In that case, the second conducting path 902 includes the first capacitor 520 and a part of the third propagation portion 921.

Figure 4:
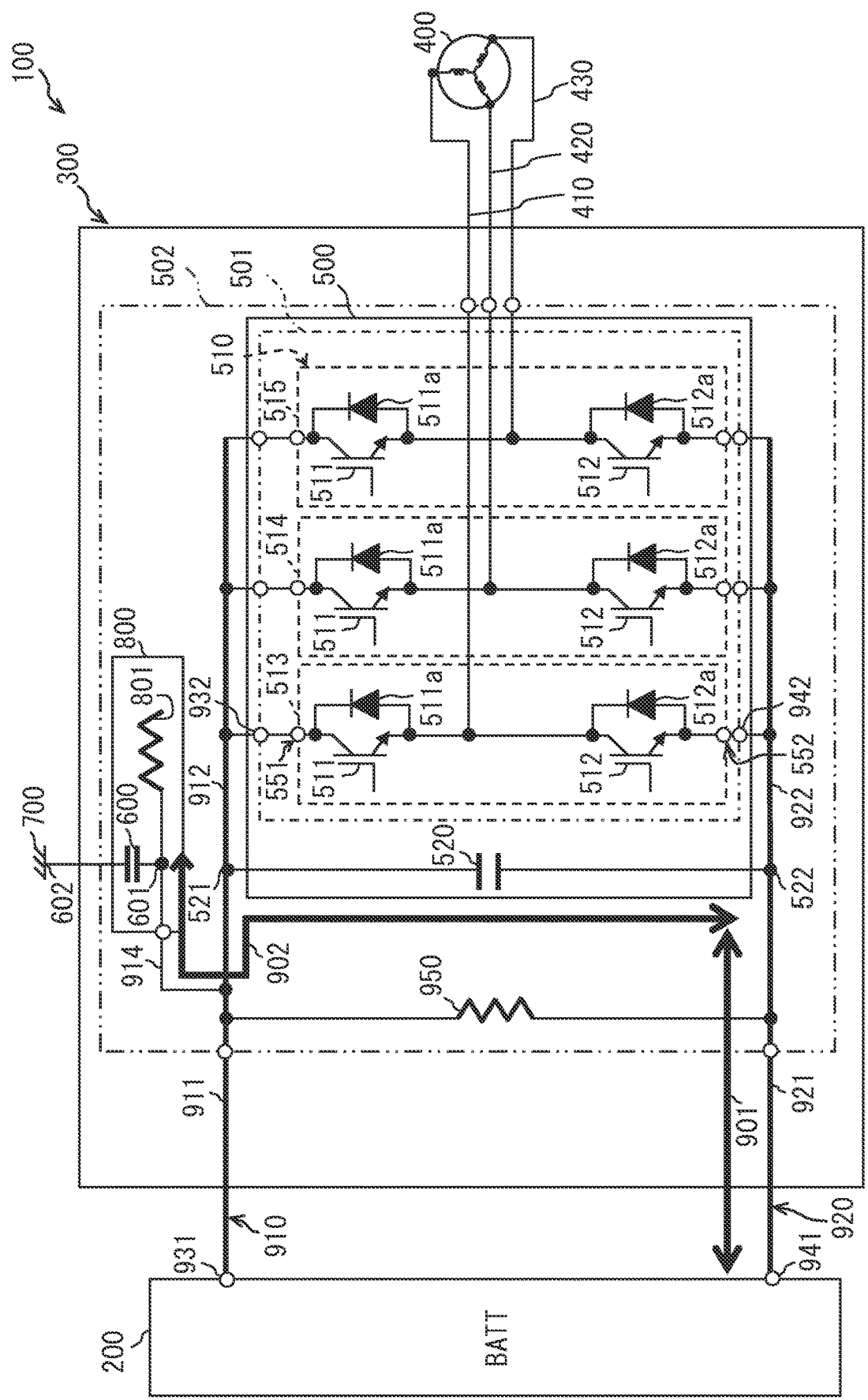
FIG. 4 is a modified example of a circuit diagram showing an in-vehicle system.

(Third Modification) The power control apparatus 300 has a resistor 801 and a discharge resistor 950 as shown in FIG. 4 in addition to the circuit components described above. A resistor 801 is mounted on the circuit board 800 together with the ECU described above. The discharge resistor 950 is connected to the first power supply busbar 910 and the second power supply busbar 920. An impedance of the resistor 801 is higher than an impedance of the discharge resistor 950.

As shown in FIG. 4, the circuit board 800 is mounted with the second capacitor 600 in addition to the ECU and the resistor 801. The second capacitor 600 is connected to the resistor 801.

The first power supply busbar 910 has a circuit board propagation portion 914 connected to the circuit board 800 in addition to the propagation portions described so far. The circuit board propagation portion 914 is connected to the second capacitor 600 and the resistor 801 respectively. Therefore, the current noise generated from the leg group 510 flows through the second capacitor 600 and the resistor 801 respectively.

As described above, the impedance of the resistor 801 is higher than the impedance of the discharge resistor 950. Therefore, the current noise is more likely to flow positively toward a side of the second capacitor 600 than toward a side of the resistor 801. This makes it possible to reduce the capacity of the second capacitor 600. A physical size of the second capacitor 600 tends to be small.

Although not illustrated, the inverter 500 may include the A-phase leg 518 and the reactor 530 in addition to the leg group 510 and the first capacitor 520.

(Other Modifications) In this embodiment, an example in which the power control apparatus 300 is included in the in-vehicle system 100 for an electric vehicle is shown. However, the application of the power control apparatus 300 is not particularly limited to the above example. For example, a configuration in which the power control apparatus 300 is included in a system of a hybrid vehicle having a motor 400 and an internal combustion engine may also be adopted.

In this embodiment, an example in which one motor 400 is connected to the power control apparatus 300 is shown. Alternatively, a configuration in which a plurality of motors 400 are connected to the power control apparatus 300 may also be adopted. In this case, the power control apparatus 300 has a plurality of three-phase switch module for configuring the inverter 500.

Although the disclosure has been described in accordance with the embodiments, it is understood that the present disclosure is not limited to such embodiment or structures. The present disclosure encompasses various modified examples and modifications within an equivalent scope. In addition, although various combinations and modes are shown in the present disclosure, other combinations and modes including only one element, more elements, or less elements are also within the scope and idea of the present disclosure.

What is claimed is:

1. A power control apparatus, comprising:
   a first wiring and a second wiring connected to a power source;
   a first capacitor connected to the first wiring and the second wiring;
   an electrical component including a plurality of switches connected in parallel with the first capacitor through the first wiring and the second wiring;
   a case which accommodates the electrical component and the first capacitor; and
   a second capacitor which is connected to one of the first wiring and the second wiring and is connected to a reference potential portion having a constant potential, wherein
   an impedance of a first conducting path between another side connection point, which is connected to the first capacitor, of the other one of the first wiring and the second wiring and a power supply not through the first capacitor is higher than an impedance of a second conducting path between the another side connection point and the second capacitor through the first capacitor, wherein
   the second capacitor is arranged outside the case.

2. The power control apparatus according to claim 1, further comprising
   the another side connection point is located between a first connection point, which is connected to the power supply, of the other one of the first wiring and the second wiring, and a second connection point, which is connected to the electrical component, of the other one of the first wiring and the second wiring.

3. The power control apparatus according to claim 1, wherein
   a third capacitor connection point, which is connected to the second capacitor, of one of the first wiring and the second wiring is located between a third connection point, which is connected to the power supply, on one of the first wiring and the second wiring, and one side connection point, which is connected to the first capacitor, of one of the first wiring and the second wiring.

4. The power control apparatus according to claim 3, wherein
   the electrical component includes, in addition to the plurality of switches, a reactor and an auxiliary switch aligned from the one side connection point toward a one side switch connection point to which the plurality of switches in the one of the first wiring and the second wiring are connected.

5. The power control apparatus according to claim 2, wherein
   the electrical component includes, in addition to the plurality of switches, a reactor and an auxiliary switch aligned from the another side connection point toward another side switch connection point to which the plurality of switches in the other one of the first wiring and the second wiring are connected.

6. The power control apparatus according to claim 1, wherein
   a capacitance of the second capacitor is larger than a stray capacitance of the power supply.

7. A power control apparatus, comprising:
   a first wiring and a second wiring connected to a power source;
   a first capacitor connected to the first wiring and the second wiring;

an electrical component including a plurality of switches connected in parallel with the first capacitor through the first wiring and the second wiring;

a circuit board on which a part of one of the first wiring and the second wiring is disposed;

a resistor which is mounted on the circuit board and has a one end connected to one of the first wiring and the second wiring; and a discharge resistor connected to the first wiring and the second wiring; and a second capacitor which is connected to one of the first wiring and the second wiring and is connected to a reference potential portion having a constant potential, wherein an impedance of a first conducting path between another side connection point, which is connected to the first capacitor, of the other one of the first wiring and the second wiring and a power supply not through the first capacitor is higher than an impedance of a second conducting path between the another side connection point and the second capacitor through the first capacitor, and wherein an impedance of the resistor is higher than an impedance of the discharge resistor, and wherein the second capacitor is mounted on the circuit board and is connected to one of the first wiring and the second wiring disposed on the circuit board.

8. The power control apparatus according to claim 7, further comprising the another side connection point is located between a first connection point, which is connected to the power supply, of the other one of the first wiring and the second wiring, and a second connection point, which is connected to the electrical component, of the other one of the first wiring and the second wiring.

9. The power control apparatus according to claim 7, wherein a third capacitor connection point, which is connected to the second capacitor, of one of the first wiring and the second wiring is located between a third connection point, which is connected to the power supply, on one of the first wiring and the second wiring, and one side connection point, which is connected to the first capacitor, of one of the first wiring and the second wiring.

10. The power control apparatus according to claim 9, wherein the electrical component includes, in addition to the plurality of switches, a reactor and an auxiliary switch aligned from the one side connection point toward a one side switch connection point to which the plurality of switches in the one of the first wiring and the second wiring are connected.

11. The power control apparatus according to claim 8, wherein the electrical component includes, in addition to the plurality of switches, a reactor and an auxiliary switch aligned from the another side connection point toward another side switch connection point to which the plurality of switches in the other one of the first wiring and the second wiring are connected.

12. The power control apparatus according to claim 7, wherein a capacitance of the second capacitor is larger than a stray capacitance of the power supply.

\* \* \* \* \*